UNITED STATES PATENT OFFICE.

WILLIAM R. PALMER, OF BRIDGEPORT, CONNECTICUT, ASSIGNOR OF ONE-HALF TO FRANK A. WILMOT, OF BRIDGEPORT, CONNECTICUT.

PROCESS OF PRODUCING HIGH-GRADE STEEL FROM LOW-GRADE MATERIAL.

13,264. Specification of Reissued Letters Patent. Reissued June 27, 1911.

No Drawing. Original No. 924,925, dated June 15, 1909, Serial No. 481,425. Application for reissue filed January 28, 1911. Serial No. 605,336.

*To all whom it may concern:*

Be it known that I, WILLIAM R. PALMER, a citizen of the United States, residing at Bridgeport, in the county of Fairfield and State of Connecticut, have invented certain new and useful Improvements in Processes of Producing High-Grade Steel from Low-Grade Material; and I do hereby declare the following to be a full, clear, and exact description of the invention, such as will enable others skilled in the art to which it appertains to make and use the same.

In basic open-hearth steel making it has heretofore been necessary to use for a considerable portion of the charge steel-making pig iron commercially known either as basic, or off-basic or Bessemer pig, the basic pig not exceeding one per cent. in silicon and the off-basic or Bessemer pig not exceeding one and one-fourth per cent. in silicon, whereas foundry pig iron from which castings and cast iron borings are produced exceeds both basic and off-basic pig in silicon, phosphorus and sulfur and its scrap makes too acid a bath to permit of any considerable portion of the scrap being used in basic open-hearth furnaces because of the acid bath attacking the basic lining of the furnace at steel-making temperatures, the silicon being particularly active in attacking the basic lining.

The ordinary process of making basic open-hearth steel consists in charging a furnace with pig iron and scrap together with the necessary flux and then melting and working this charge to the desired chemical composition and temperature. The flux, ordinarily limestone, forms a slag which absorbs and retains the impurities, silicon, sulfur and phosphorus, to a greater or less extent dependent on the basic qualities of the slag so formed; thereby purifying the metal. Simultaneously, however, with the oxidation of the impurities the carbon also is partially oxidized and the furnace must be charged with sufficient carbon in some form to cover this loss by oxidation and to insure sufficient carbon remaining in the bath after the metallic charge is melted. This required carbon is generally contained in the pig iron, and the furnace must therefore be charged with sufficient pig iron to impart the necessary amount of carbon to the bath. As pig iron is the most expensive portion of the charge, the addition of the necessary amount of pig iron greatly increases the cost of the steel.

My present invention enables me to greatly reduce the cost of production of high grade steel. This I accomplish by using in lieu of pig iron, materials that are commercially worth one-half, more or less, the cost of pig iron, as for example cast iron borings, large pieces of castings, cast scrap and other low grade material which cannot be used in any appreciable quantity in the ordinary open-hearth process on account of the high percentage of impurities they contain.

Cast iron borings are of somewhat similar composition to pig iron, but cannot be used in the ordinary process of making basic open hearth steel for the reason that the percentage of silicon in cast iron borings is so much higher than in basic pig iron as to cause the destruction of scorification of the furnace hearth, and the neutralizing and destroying of the basic effect of the limestone and interfering with the removal of the other impurities. The percentage of sulfur is also much higher in cast iron borings than in pig iron owing to the absorption of sulfur from the fuels in former meltings. Sulfur, in fact, is the most difficult impurity to remove or oxidize from the bath, and if not removed or oxidized greatly decreases the quality and value of the steel. Still another reason why cast iron borings cannot be used in the ordinary open hearth process of making steel is their physical condition, they being finely granular or powdered, which renders them unfit for use in appreciable quantity in the ordinary open hearth process as this condition interferes with the melting, the material lying in such close mass that the heat will not penetrate and long delayed melting results from the use of any appreciable quantity of borings in this process. The same is true both as regards the physical and chemical composition of large castings or chunks or large pieces of cast iron.

With this description of the low grade materials which I may use in carrying out my novel process and the physical and chemical characteristics thereof, it will be sufficient to refer to them generically as low grade material.

In carrying out my invention I use two or more open-hearth furnaces, the first of which I call the primary furnace and the other or others secondary or finishing furnaces, for the reason that a single primary furnace will keep from two to four secondary furnaces running, depending of course upon the size of the furnaces. The primary furnace I run at what is relatively a low temperature in steel making for example, at a temperature one thousand degrees Fahrenheit, more or less, below the ordinary temperature of steel making. The secondary furnace or furnaces are run at ordinary steel-making temperatures.

The running of the primary furnace at a relatively low temperature prevents any appreciable attack of the silicon on the basic lining of the furnace and also partially eliminates the silicon, phosphorus and sulfur. From this primary furnace I tap for use in the secondary furnace a molten metal representing in analysis a semi-pig or semi-steel, it being refined as to silicon, phosphorus and sulfur to about one-half of the percentage of these elements contained in basic pig iron, the further refinement at steel-making temperatures being accomplished in the secondary furnace. The primary furnace may be of the tilting type and the secondary furnace or furnaces of the stationary type. In starting, the primary furnace is charged with pig iron or with large chunks or pieces of cast iron to form a liquid bath of iron to which is added sufficient flux to cover the metal and to partially oxidize the impurities at the same time preventing oxidation of the metal. It should be noted that this is done only in starting the primary furnace, as thereafter sufficient metal is left in the primary furnace to form the bath.

After the bath is so formed the low grade material as already defined, either as metallic iron or iron oxid, is added in such quantities and as rapidly as the melting will permit together with the required amount of flux in the shape of limestone or other materials cold or in the shape of fluid slag from the finishing furnace or furnaces, as will be more fully explained.

The secondary or finishing furnace is partially charged with any low grade material as scrap and a sufficient quantity of flux and when the heated metal is in semi-molten condition it is ready for the molten metal from the primary furnace.

In transferring the molten metal from the primary furnace to a secondary furnace, if the secondary furnace is at a low enough level, the molten metal may be poured from the primary furnace into a trough at sufficient incline to permit it to flow into the secondary furnace. This arrangement is not common, however, with furnaces already in use. Ordinarily in transferring the metal I pour it from the primary furnace into a ladle which is handled by a crane. Suppose now that the partial charge in the secondary furnace has been brought to a suitable condition, and the charge in the primary furnace is ready for pouring. The quantity of metal that it is desired to transfer is poured from the primary furnace into the ladle which is moved to the secondary furnace and the metal delivered thereto from the ladle. It will be noted that a sufficient quantity of the molten metal, one-half more or less of the charge, is left in the primary furnace. This molten metal in the primary furnace forms a bath which facilitates and hastens the melting of the next charge of low grade material which may then be placed in the primary furnace. No slag from the primary furnace is allowed to enter the secondary furnace, but this slag having lost its efficiency is removed. When the charge in the secondary furnace has reached the proper condition it is drawn off in the usual manner. The efficiency of the slag from the secondary furnace, however, has been only partially impaired by the operation of said furnace. After the tapping of the heat of steel from the secondary furnace the slag from said furnace may or may not be run into the ladle and transferred to the primary furnace to assist in the working of the charge therein. This charge of molten slag from the secondary furnace assists to a certain extent in working the charge in the primary furnace and also acts to partially remove and retain the impurities from the charge in the primary furnace. As this slag is charged in a molten condition, there is no cooling effect produced by it and no retarding of the work of the primary furnace. The charging of the slag from the secondary furnace into the primary furnace has this further beneficial effect of immediately protecting the metal from oxidation and protecting the furnace bottom from scorification. As it is already formed the loss of carbon resulting from the formation of new slag is avoided.

As soon as the secondary furnace has been drawn off it may be immediately partially charged again with scrap or other low grade material; even cast iron borings may be used in moderate quantities. The essential feature of the invention, however, is that by partially refining the charge in the primary furnace, then transferring a portion of the charge to the secondary furnace for the completion of the refining operation and leaving sufficient molten metal in the primary furnace to form a molten bath for the next charge of low grade material, I avoid the necessity for the use of pig iron or any high grade material to furnish the necessary amount of carbon and produce a high grade of steel from a low grade of material. The operation at the secondary furnace is greatly hastened by the additon of the charge of molten metal from the primary furnace. As the charge in the secondary furnace is already in a suitable condition, the more or less violent reaction produced by the charge of molten metal from the primary furnace will remove the impurities very rapidly. I find in practice that furnaces operated by this process produce as much, or more, steel from a charge of low grade material as from an ordinary pig iron and scrap charge, and that the steel so produced is fully equal in physical qualities and chemical composition to steel produced from a pig iron and scrap charge.

Having thus described my invention I claim:—

1. In the manufacture of open-hearth steel, the process which consists in charging a primary furnace with low grade material of the character described, operating said furnace at a temperature materially below ordinary steel-making temperatures, partially charging a secondary furnace with low grade material, operating said furnace at ordinary steel-making temperatures and transferring a portion of the charge of the primary furnace to the secondary furnace for the completion of the refining operation leaving a portion of the charge in the primary furnace to form a bath to receive the next charge of low grade material.

2. In the manufacture of open-hearth steel, the process which consists in charging a primary furnace with low grade material of the character described, operating said furnace at a temperature materially below ordinary steel-making temperatures, partially charging a secondary furnace with scrap and flux, operating said furnace at ordinary steel-making temperatures and transferring a portion of the charge of the primary furnace to the secondary furnace for the completion of the refining operation, leaving a portion of the charge in the primary furnace to form a molten bath to receive the next charge of low grade material.

3. In the manufacture of open hearth steel, the process which consists in charging a primary furnace with low grade material of the character described, operating said furnace at a temperature materially below ordinary steel-making temperatures, partially charging a secondary furnace with low grade material and flux, operating said furnace at ordinary steel-making temperatures, transferring a portion of the charge from the primary furnace to the secondary furnace for the completion of the refining operation, leaving a portion of the charge in the primary furnace to form a molten bath, re-charging the primary furnace with low grade material and charging the primary furnace with slag from the secondary furnace.

4. In the manufacture of open-hearth steel, the steps consisting of charging a primary furnace with low grade material of the character described, operating said furnace at a temperature materially below ordinary steel-making temperatures to partially refine the same, transferring charges of the partially refined material from said primary furnace to a basic open-hearth furnace, and reducing the same into steel.

5. In the manufacture of open-hearth steel, the process which consists in charging a primary furnace with low grade material of the character described, operating said furnace at a temperature materially below ordinary steel-making temperatures, maintaining a bath of molten metal in the primary furnace, and transferring charges of said partially refined bath from time to time to a basic open hearth furnace, and refining the same into steel.

6. In the manufacture of open-hearth steel, the process which consists in charging a primary furnace with low grade material of the character described, operating said furnace at a temperature materially below ordinary steel-making temperatures, partially charging a secondary basic open-hearth furnace with other metal, and transferring a portion of the partially refined charge of the primary furnace to the secondary furnace to complete the charge, and reducing the same into steel in said secondary open-hearth furnace.

In testimony whereof, I have hereunto set my hand this 23rd day of January 1911.

WILLIAM R. PALMER.

Witnesses:
JAMES J. PHALEN,
DANIEL A. KRATING.